(12) United States Patent
Kecht et al.

(10) Patent No.: US 10,995,231 B2
(45) Date of Patent: May 4, 2021

(54) SECURITY PIGMENT, LUMINESCENT POLYMER RESIN AND METHOD FOR PRODUCING SAME

(71) Applicant: GIESECKE+DEVRIENT CURRENCY TECHNOLOGY GMBH, Munich (DE)

(72) Inventors: Johann Kecht, Munich (DE); Axel Schlossbauer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 314 days.

(21) Appl. No.: 15/773,240

(22) PCT Filed: Nov. 9, 2016

(86) PCT No.: PCT/EP2016/001864
§ 371 (c)(1),
(2) Date: May 3, 2018

(87) PCT Pub. No.: WO2017/080655
PCT Pub. Date: May 18, 2017

(65) Prior Publication Data
US 2018/0320015 A1 Nov. 8, 2018

(30) Foreign Application Priority Data
Nov. 11, 2015 (DE) ..................... 10 2015 014 526.6

(51) Int. Cl.
| | |
|---|---|
| C09D 11/50 | (2014.01) |
| C09K 11/06 | (2006.01) |
| B42D 25/29 | (2014.01) |
| B42D 25/382 | (2014.01) |
| B42D 25/387 | (2014.01) |
| B42D 25/00 | (2014.01) |
| B42D 25/30 | (2014.01) |
| B32B 27/30 | (2006.01) |
| B42D 25/36 | (2014.01) |
| C09B 67/02 | (2006.01) |
| C09K 11/02 | (2006.01) |
| D21H 21/40 | (2006.01) |
| C09B 67/46 | (2006.01) |
| B42D 25/373 | (2014.01) |
| B42D 25/378 | (2014.01) |
| B01J 13/04 | (2006.01) |
| C09B 67/04 | (2006.01) |
| C09D 11/037 | (2014.01) |
| C09K 9/02 | (2006.01) |
| C08L 33/12 | (2006.01) |

(Continued)

(52) U.S. Cl.
CPC ............... *C09D 11/50* (2013.01); *B01J 13/04* (2013.01); *B32B 27/30* (2013.01); *B42D 25/00* (2014.10); *B42D 25/29* (2014.10); *B42D 25/30* (2014.10); *B42D 25/36* (2014.10); *B42D 25/373* (2014.10); *B42D 25/378* (2014.10); *B42D 25/382* (2014.10); *B42D 25/387* (2014.10); *C09B 67/0002* (2013.01); *C09B 67/009* (2013.01); *C09B 67/0097* (2013.01); *C09D 11/037* (2013.01); *C09K 9/02* (2013.01); *C09K 11/02* (2013.01); *C09K 11/025* (2013.01); *C09K 11/06* (2013.01); *D21H 21/40* (2013.01); *B42D 25/355* (2014.10); *C08L 33/12* (2013.01); *C09K 2211/1014* (2013.01); *C09K 2211/1018* (2013.01); *C09K 2211/1033* (2013.01); *C09K 2211/1048* (2013.01); *C09K 2211/1051* (2013.01); *C09K 2211/1092* (2013.01); *C09K 2211/182* (2013.01); *G07D 7/003* (2017.05); *G07D 7/1205* (2017.05); *G07D 2207/00* (2013.01)

(58) Field of Classification Search
CPC ........ C09D 17/00; C09D 11/037; C09D 7/41; C09D 7/69; C09D 5/22; C09B 67/0002; C09B 67/0097; C09K 11/06; C09K 11/025; D21H 21/40
See application file for complete search history.

(56) References Cited

U.S. PATENT DOCUMENTS

| | | | |
|---|---|---|---|
| 4,833,311 | A | 5/1989 | Jalon |
| 4,891,505 | A | 1/1990 | Jalon |

(Continued)

FOREIGN PATENT DOCUMENTS

| | | |
|---|---|---|
| DE | 102006008245 A1 | 8/2007 |
| DE | 102006048638 A1 | 4/2008 |

(Continued)

OTHER PUBLICATIONS

Translation for JP 08-208976, Aug. 13, 1996.*
International Search Report from PCT Application No. PCT/EP2016/001864, dated Jan. 24, 2017.

*Primary Examiner* — C Melissa Koslow
(74) *Attorney, Agent, or Firm* — Workman Nydegger

(57) ABSTRACT

The invention relates to a pigment particle for security applications, comprising a duromer matrix and a plurality of core particles of a thermoplastic polymer with a feature substance dissolved in the core particles embedded therein, wherein the feature substance is an organic or metalorganic substance. The invention further relates to a method for producing security pigments, for example luminescent printing pigments, by means of incorporation into a duromer matrix of thermoplastic polymer particles in which the luminescent illuminant is present respectively in dissolved form.

19 Claims, No Drawings

(51) Int. Cl.
*B42D 25/355* (2014.01)
*G07D 7/1205* (2016.01)
*G07D 7/00* (2016.01)

(56) References Cited

U.S. PATENT DOCUMENTS

| | | |
|---|---|---|
| 5,795,379 A | 8/1998 | Schwenk et al. |
| 2014/0197364 A1 | 7/2014 | Richards-Johnson et al. |
| 2014/0286875 A1 | 9/2014 | Gamsey et al. |

FOREIGN PATENT DOCUMENTS

| | | | |
|---|---|---|---|
| EP | 0226367 B1 | | 2/1990 |
| EP | 0256922 B1 | | 7/1991 |
| EP | 1445988 A1 | | 8/2004 |
| EP | 1208382 B1 | | 4/2006 |
| JP | 08-208976 | * | 8/1996 |
| WO | 0240600 A1 | | 5/2002 |

* cited by examiner

SECURITY PIGMENT, LUMINESCENT POLYMER RESIN AND METHOD FOR PRODUCING SAME

BACKGROUND

The invention relates to a security pigment, in particular a security pigment on the basis of a luminescent polymer resin, and a method for producing the same.

The invention relates in particular to a method for producing a security pigment, for example a luminescent printing pigment, by means of incorporating into a duromer matrix thermoplastic polymer particles in which the luminescent illuminant is present in dissolved form in each case. Through the molecular distribution of the illuminant in the thermoplastic polymer particles the quantity of the dye required for reaching a certain luminance can be reduced strongly. The subsequent incorporation into a duromer matrix protects the dye additionally against attacks with a solvent dissolving the polymer and aqueous acids and bases.

The document U.S. Pat. No. 5,795,379 A describes the incorporation of luminescent dyes into a solid resin. The document addresses merely the use of polyisocyanates as the duromer matrix and methods for producing the same. The incorporation of a dye dissolved in a second polymer is not mentioned in the document. Only insufficient protection is reached against aqueous acids and bases; moreover, a large quantity of illuminant is required for reaching a great brightness.

The document DE 10 2006 008 245 A1 describes the direct enveloping of an organic luminescent substance with an organic or inorganic shell or with several organic or inorganic shells for increasing the light resistance of the enveloped dye. In this case, the polymer enveloping the incorporated dye acts as a shell protecting against the action of light.

In contrast, the luminescent dyes are present in dissolved form in a polymer in the present invention, thus strongly reducing the quantity of dye required for reaching a certain luminance. By the additional incorporation into a duromer matrix, a complementary protection of the feature substance is achieved against chemical attacks by solvents and aqueous acids and bases. In this case, the duromer matrix does not serve as a typical shell of a single core-shell particle, but rather as a putty surrounding several cores. This offers production-technical advantages, such as for example grindability without loss of the complementary protective effect.

The document EP 1 208 382 B1 describes the embedding of various discrete ink particles, e.g. fluorescent micro beads of polystyrene, into a matrix and their subsequent enveloping with a tight shell which acts as a diffusion barrier. Also in this state of the art, the enveloping of the dyes is employed as protection against aqueous, external influences. This solution is technically elaborate and hard to scale in view of large production quantities, since e.g. by grinding microencapsulated particles the shell is damaged and its protective effect is lost as a consequence.

The patent EP 0 226 367 B1 describes the agglomeration of fluorescent condensation polymer particles with various polymers to form large agglomerate particles. This method is technically elaborate, since it is difficult to dissolve fluorescent substances in sufficiently finely distributed form within condensation polymers.

According to the present invention, this problem is bypassed by using thermoplastics. Moreover, hydrophobic thermoplastics offer better protection against aqueous acids and bases.

The object of the present invention is to supply a luminescent printing pigment that is improved vis-à-vis the state of the art. Further, the object of the present invention is to supply a method improved vis-à-vis the state of the art for producing a luminescent printing pigment.

These objects are achieved by the combinations of features defined in the independent claims. Developments of the invention are the subject matter of the subclaims.

SUMMARY OF THE INVENTION 1. (First aspect) Pigment particles for security applications, comprising
   a duromer matrix, and
   a plurality of core particles of a thermoplastic polymer with a feature substance dissolved in the core particles embedded therein, wherein the feature substance is an organic or metalorganic substance.
2. (preferred) The pigment particles according to paragraph 1, wherein the feature substance is a fluorescent or phosphorescent or photochromic or thermochromic feature substance or a UV or IR or VIS absorption dye.
3. (preferred) The pigment particles according to paragraph 1 or 2, wherein the fluorescent or phosphorescent feature substance is excitable in the UV spectral range and emits in the visible spectral range.
4. (preferred) The pigment particles according to any one of paragraphs 1 to 3, wherein the fluorescent or phosphorescent feature substance is excitable in the UV spectral range or in the visible spectral range and emits in the IR spectral range.
5. (preferred) The pigment particles according to any one of paragraphs 1 to 4, wherein in the core particles two different luminescent dyes are present in dissolved form, which form an energy transfer system in which the first dye after excitation transfers its excitation energy partially or completely to the second dye.
6. (preferred) The pigment particles according to any one of paragraphs 1 to 5, wherein the thermoplastic polymer is selected from polystyrene (PS), polyacrylates, polyethylene (PE), polypropylene (PP), polycarbonates (PC), polyamides (PA), polyurethanes (PU), polyureas (PH), polyethylene terephthalate (PET) or other polyesters, preferably from polystyrene (PS) or from one of the polyacrylates polymethyl methacrylate (PMMA), polyvinyl acetate (PVAC), polyvinyl chloride (PVC), polyacrylonitrile (PAN), particularly preferably from polystyrene (PS) or polymethyl methacrylate (PMMA).
7. (preferred) The pigment particles according to any one of paragraphs 1 to 6, wherein the chain lengths of the thermoplastic polymer are in the range of 1,000-1,000,000 g/mol, in particular at 50,000-250,000 g/mol.
8. (preferred) The pigment particles according to any one of paragraphs 1 to 7, wherein the duromer matrix comprises an addition polymer, preferably a mixture of different mono-, di- or triamines and a trimeric isocyanate monomer, particularly preferably the isocyanurate trimer of isophorone diisocyanate.
9. (preferred) The pigment particles according to any one of paragraphs 1 to 8, wherein the thermoplastic core particles are present in the duromer matrix at a concentration between 0.1 and 25 weight percent, in particular 3 to 20 weight percent.
10. (preferred) The pigment particles according to any one of paragraphs 1 to 9, which are stable against toluene, ethyl acetate, hydrochloric acid (5%), sodium hydroxide solution (2%) and sodium hypochlorite solution (5% active chlorine) in accordance with the test method A5, preferably A30, wherein the feature intensity remaining after the test is higher than 80% of the initial intensity.

11. (preferred) The pigment particles according to any one of paragraphs 1 to 10, which are stable against acetone in accordance with the test method A5, wherein the feature intensity remaining after the test is higher than 80% of the initial intensity.

12. (Second aspect) A method for producing pigment particles for security application, comprising a duromer matrix and a plurality of core particles of a thermoplastic polymer with a feature substance dissolved in the core particles embedded therein, wherein the feature substance is an organic substance or a metalorganic complex, having the steps of:

a) the step of dissolving an organic or metalorganic feature substance in a thermoplastic polymer to supply in this manner thermoplastic particles with feature substance dissolved therein; and b) the step of incorporating the thermoplastic particles with feature substance dissolved therein obtained in step a) in a duromer matrix, c) the step of grinding the product obtained in step b) to pigment particles.

13. (preferred) The method according to paragraph 12, wherein step a) comprises the following partial steps of:

a1) dissolving the thermoplastic polymer and the organic or metalorganic feature substance in an organic solvent;

a2) dispersing the solution of step a1) in an aqueous medium employing a surfactant;

a3) removing the organic solvent;

a4) isolating the core particles and wherein in step b) the embedding of the core particles is effected preferably by a kneading or extrusion process of the core particles together with the monomers of the addition polymer; and wherein in step c) the grinding of the pigment particles is effected to a grain size (d99) of smaller than 25 µm, preferably smaller than 12 µm, particularly preferably smaller than 6 µm.

14. (Third aspect) An ink concentrate, comprising pigment particles according to any one of claims 1 to 11, in particular with a concentration of the pigment particles of more than 40% (weight percent).

15. (Fourth aspect) A printing ink for offset printing, screen printing or steel intaglio printing, comprising pigment particles according to any one of claims 1 to 11, preferably with a concentration of the pigment particles of 1 to 40% (weight percent), particularly preferably 1 to 20% weight percent.

16. (Fifth aspect) A value document, comprising security pigments according to any one of claims 1 to 11.

DETAILED DESCRIPTION OF THE INVENTION

The present invention includes an advantageous development of the method known from the document U.S. Pat. No. 5,795,379 A of incorporating luminescent dyes into a solid resin. In the process according to the invention the luminescent dyes or feature substances are not extruded directly with the components of the resin, but are dissolved in little spheres (or particles) of a thermoplastic polymer in a prior step. The concentration of the dye dissolved in the polymer is preferably in a range from 0.01% to 15% here. Through said prior step, it is possible in comparison to an organic dye directly extruded into a resin to reach the same brightness of the final product with a substantially lower quantity, e.g. 10% to 60%, of the organic luminescent substance.

The present invention does expressly not concern core-shell particles with a defined, uniform geometry.

A further advantage of the product according to the invention is constituted by the stabilization of the organic dyes dissolved in the polymer against aqueous acids and bases. A complete, uninterrupted enveloping of the polymer with the enveloping, condensed resin is not decisive in this regard, in contrast to the pigments described in the document EP 1 208 382 B 1. The polymer (for example PMMA) containing the luminescent dye or feature substance, as a consequence of its poor wettability with aqueous solutions, acts as a barrier against aqueous acids and bases, thus reducing the contact between the dissolved, labile dyes and the acids and bases.

The embedding of the stable polymer spheres in a resin further allows for the easy adjustment of the pigment grain size advantageous for the respective printing process by means of grinding, which results in a simple and cost-effective scalability of the production process.

Further, the embedding of differently colored spheres allows for adjusting the desired luminescence color tone in a simple manner by additive color mixing. According to a preferred embodiment, different dyes are incorporated into the polymer together in order to adjust the desired luminescence color tone by additive color mixing.

The production method according to the invention has two steps. In the first production step, the luminescent organic substance or feature substance is dissolved in a thermoplastic polymer. For this purpose, the polymer (for example polymethyl methacrylate or polystyrene) is dissolved together with the luminescent substance or a different feature substance in a suitable organic solvent (for example dichloromethane). To transform the polymer with the dissolved dye or feature substance back into a solid form, various forms of synthesis can be chosen. Preferably, the polymer solution is dispersed in water with the aid of a surfactant (for example sodium dodecyl sulfate) and the solvent is removed from the mixture by simple evaporation. A further possibility is the precipitation of the polymer (including the dissolved dye/feature substance) in diethyl ether with subsequent grinding to the desired grain size (effected under cooling in particular). The preferred grain size (d99) of the polymer particles amounts to less than 7 µm, particularly preferably less than 3 µm.

The thermoplastic cores consist of thermoplastic polymers, preferably of a thermoplastic, non-crosslinked polymer. According to a preferred embodiment, the polymer of the core material consists of polymerized ethylene derivatives, further preferably of polystyrene (PS) or polyacrylates, including preferably of polymethyl methacrylate (PMMA), polyvinyl acetate (PVAC), polyvinyl chloride (PVC) or polyacrylonitrile (PAN) or of a copolymer containing one or several of the afore-mentioned polymers, such as acrylonitrile-butadiene-styrene copolymer (ABS). According to a further preferred embodiment, the ethylene derivatives are polyethylene (PE), polypropylene (PP) or other polymers constructed from aliphatic carbon chains. According to a further preferred embodiment, the polymer of the core material consists of polycarbonates (PC), polyamides (PA) or polyesters, e.g. polyethylene terephthalate (PET).

The chain length of the polymers of the core material are preferably in a range from 1,000 to 1,000,000 g/mol, particularly preferably in a range from 50,000 to 250,000 g/mol.

After conclusion of the first synthesis step the polymer particles produced in accordance with the above description are incorporated as luminescent substances into a duromer matrix in the second production step. For this purpose the polymer particles can be extruded or kneaded together with the raw materials of the employed type of resin (for example polyurethane resin or polyurea resin). The preferred concentration of the polymer particles in the mixture is in a range of 0.1% to 25%, particularly preferably in a range of 3% to 20% (i.e. weight percent). After conclusion of the extrusion or kneading process, the obtained resin containing polymer particles is ground to a resin powder, wherein the grain size can be adjusted in view of the desired printing process.

According to a preferred embodiment, addition polymers are employed for producing the duromer matrix treated with the thermoplastic cores. Here, preferably a mixture of a trimeric isocyanate monomer, preferably the isocyanurate trimer of isophorone diisocyanate, and different mono-, di- or triamines are heated to 150° C. to 250° C., preferably 180° C., in an industrial kneader and kneaded up to hardening in the process.

According to a further preferred embodiment, for producing the duromer matrix treated with the thermoplastic cores, a mixture of a trimeric isocyanate monomer, preferably the isocyanurate trimer of isophorone diisocyanate, and different mono-, di- or triamines is extruded with a rising temperature profile in a screw extruder at temperatures in a range of 5° C. to 250° C.

After conclusion of the extrusion process or kneading process, the obtained resin powder containing the feature substances is ground to the grain size corresponding to the respective application. For example, pigments for use in offset printing applications preferably have a grain size (d99)<12 μm. For use in screen printing applications the pigments preferably have a grain size (d99)<25 μm. For use in steel intaglio printing applications the pigments preferably have a grain size (d99)<6 μm.

According to a preferred embodiment the pigments have a grain size (d99) of less than 6 μm.

As feature substances predominantly organic or metalorganic molecules are suitable that can be dissolved in nonpolar organic solvents. The incorporation of inorganic pigment particles or quantum dots, etc. is technically difficult (i.a. no dissolution in the core polymer, possibly agglomeration) and does not offer all advantages according to the invention, such as the increased luminosity per illuminant quantity used, and is not preferred for this reason.

According to a preferred embodiment the feature substance is a luminescent dye. According to a preferred embodiment the luminescent dye is a fluorescent dye. According to a further preferred embodiment the luminescent dye is a phosphorescent dye. According to a further preferred embodiment the luminescent dye is a luminescent dye excitable in the UV range, which emits in the visible spectral range. According to a further preferred embodiment said luminescent dye is one that is excitable in the visible spectral range, which emits in the visible spectral range. According to a further preferred embodiment the luminescent dye is one that emits in the infrared range. The dyes can be both purely organic molecules and metalorganic complexes.

According to a preferred embodiment two or more fluorescent or phosphorescent luminescent dyes are mixed to create an energy transfer system or FRET system, in which the first luminescent dye after excitation can emit its excitation energy partially or completely to the second luminescent dye. In the case of such a FRET system one of the luminescent dyes involved is preferably excitable in the UV range and emits in the visible spectral range, while the other luminescent dye is excitable in the visible spectral range and emits in the visible spectral range.

Examples of substance classes of luminescent dyes which are UV-excitable or excitable in the visible spectral range and which emit in the visible spectral range, are purely organic luminescent dyes and luminescent metal complexes. Possible classes of dyes are for example diaryl polyenes, diaryl ethenes, aryl acetylenes, oxazoles, pyrazoles, benzazoles, anthrones, quinones, cyanines, rhodamines, oxazines, phenoxazines, thiazines, phenothiazines, perylenes, terylenes, coumarins, benzoxazinones or benzothiazinones, as well as rare earth metal complexes, such as β-diketonate rare earth metal complexes or dipicolinate rare earth metal complexes, herein preferably neutrally charged rare earth metal complexes. Other classes of organic luminescent dyes can be used as well. In particular, perylene dyes are preferably used as the dye class for luminescent dyes excitable in the visible spectral range and emitting in the visible range, due to their high light stability.

Examples of suitable luminescent dyes emitting in the infrared range are organic fluorescent dyes or luminescent metal complexes, such as IR-1048, Cy7 or $Nd(TTA)_3$ (neodymium tris-thenoyltrifluoroacetonate).

Examples of FRET systems are e.g. mixtures of a green-yellow excitable fluorescent dye and a green-yellow emitting fluorescent dye, for example a mixture with a weight ratio of 1:15 of 2,9-bis(2,6-diisopropylphenyl)anthra[2,1,9-def: 6,5,10-d'e'f']diisoquinoline-1,3,8,10(2H,9H)-tetraone ($C_{48}H_{42}N_2O_4$, a green excitable perylene dye having an orange luminescence emission, hereinafter referred to as "F-orange"), and N-(2-(4-oxo-4H-benzo[d][1,3]oxazine-2-yl)phenyl)naphthalene-2-sulfonamide ($C_{24}H_{16}N_2O_4S$, a UV-excitable luminescent dye having a green luminescence emission, hereinafter referred to as "F-green").

A FRET system can also serve to read out a forensic component in a luminescent pigment. Thus, the acceptor dye can be excited not only by an energy transfer of the donor dye, but also a direct excitation of the acceptor dye can lead to its luminescence. For example, a mixture of F-Orange and F-green can be excited on the one hand in the UV-A range, e.g. at 365 nm (excitation of the F-green followed by energy transfer to F-orange). On the other hand, for a forensic test the F-orange can also be excited directly, for example by light of the wavelength 525 nm. The direct excitation of the acceptor substance can thus be employed to distinguish FRET systems from other dye systems, and offers an additional security level, which can be analyzed e.g. in a laboratory or automatically by sensors.

According to a preferred embodiment the luminescent dye therefore contains an energy transfer system (FRET system), preferably a FRET system of a UV-excitable luminescent dye as the donor and a luminescent dye excitable in the visible range as the acceptor. The acceptor is preferably a perylene dye. The acceptor is preferably employed as forensic marker.

Preferably the feature substance is an infrared absorber. Particularly preferably, the infrared absorber has no or only little absorption in the visible spectral range. According to a preferred embodiment the absorbers are narrow-band (e.g. with an FWHM ("full width at half maximum") of less than 200 nm) or sharp-band (e.g. with an FWHM of less than 30 nm) and thus absorb in a narrow spectral range. According to a further preferred embodiment the absorbers absorb in broad-band manner (e.g. with an FWHM greater than 200 nm). According to a preferred embodiment the absorption maximum of the infrared absorber is in the range from 700 nm to 900 nm, preferably in a range of 700 nm to 800 nm, and is therefore suitable to be read out via standard infrared sensors for banknotes. According to a further preferred embodiment, the absorption maximum of the infrared absorber is above 900 nm, further preferably above 950 nm, particularly preferably in the range of 1,000 nm to 1,100 nm, and is thus not detected by standard infrared sensors for banknotes, however can be detected by special infrared sensors for banknotes.

According to a preferred embodiment the absorption maximum or a strong absorption band of the UV absorber is in the UV-A range of 315 nm to 380 nm, particularly preferably in the range of 350 nm to 380 nm. According to a further preferred embodiment the absorption maximum or a strong absorption band of the UV absorber is in the UV-B/C range of 200 nm to 315 nm, further preferably of 220 nm to 290 nm, particularly preferably of 240 nm to 270 nm.

Suitable infrared absorbers are for example commercially available from the company Fujifilm Imaging Colorants (e.g. CCK-55), the company BASF (e.g. Lumogen IR-Absorber), or the company Epolin under the brand name Epolight. For example, Epolight 4101 absorbs in narrowband manner at 739 nm and shows no perceptible inherent color when incorporated into a polymer in a diluted form. Likewise, for example Epolight 4831 absorbs in narrowband manner at 1,000 nm, and shows no perceptible inherent color when incorporated into a polymer in a diluted form.

Suitable UV absorbers are for example available from the company BASF under the trade names Tinuvin and Chimassorb. For example, Tinuvin 326 has a strong absorption band at 360 nm and Chimassorb 81 has a strong absorption band at 330 nm.

According to a preferred embodiment the feature substance is a switchable dye. Preferably, it is a thermochromic or photochromic dye. According to a preferred embodiment the switchable dye is a photochromic compound. Preferably, this is a photochromic compound which is switchable between a first visible state and a second visible or invisible state. The switching in one direction is preferably carried out by irradiation with UV light, while the switching back is carried out either by itself (thermally) or by irradiation with visible light.

According to a preferred embodiment the photochromic dyes are also luminescent dyes. Here, both or only one of the switching states of the dye can be capable of luminescence. The various switching states can have identical luminescent properties (e.g. emission at the same wavelength) or different luminescent properties (e.g. change of the emission wavelength after switching operation).

According to a preferred embodiment the absorption band or emission band generated by the switching operation, in particular the generated absorption band, is in the visible spectral range.

According to a further preferred embodiment the absorption band or emission band generated by the switching operation is in the infrared range, e.g. in a range of 700 nm to 900 nm.

Examples of suitable thermochromic dyes are, for example, (a) organic molecules which change their color through structural change upon a change of the temperature, such as 9,9'-bixanthylidene and 10,10'-bianthronylidene; (b) combinations of a leuco dye (e.g. spirolactones, spiropyranes) and a reversible proton donor (e.g. bisphenol A, 1,2,3-triazoles) and a phase change material (e.g. paraffin), which change their color through protonation/deprotonation of the leuco dye upon a change of the temperature; (c) dyes or metal complexes which change their color intensity in temperature-dependent manner, e.g. temperature quenching in europium complexes; and (d) combinations of several dyes having different temperature behavior (e.g. a mixture of terbium and europium complexes, such as described i.a. in the document EP 0 256 922 B1, which can luminesce red or green in temperature-dependent manner).

Here, (a) and (d) are preferred due to the clear color change, and (b) is less preferred due to the complexity and difficult implementation.

Examples of suitable photochromic dyes are for example spiropyranes, stilbenes/azastilbenes, triarylmethanes, nitrones, fulgides, naphthopyranes spirooxazines, quinones and diaryl ethenes. Due to their high light stability diaryl ethenes are preferred. For example, the diaryl ethene BTF6 (=1,2-bis(2-methyl-1-benzothiophene-3-yl)perfluorocyclopentene) in the open ring structure absorbs in the UV range at 200 nm to 300 nm and has no perceptible absorption bands in the visible spectral range, thus is colorless. After irradiation with UV light of the wavelength 254 nm, however, it converts into the closed ring structure which has an absorption band in the visible spectral range at 530 nm, thus is colored. Upon excitation with UV light of the wavelength 315 nm both the closed and the open ring structure emit at 450 nm, thus a luminescent dye is given at the same time.

By waiting (thermal) or irradiation with visible light, e.g. light of the wavelength 400 nm, the closed ring structure can be returned to the open ring structure.

Further, it is possible to prepare more complex codings through a targeted combination (or common encapsulation) of different feature substances, and to prepare feature particles that are suitable for different machine-readable verification methods at the same time.

In addition to the feature substance, further additives can be added to the polymer particles.

According to a preferred embodiment, so-called plasticizers, such as diethylhexyl adipate, dibutyl phthalate or diisononyl phthalate, are added to the polymer particles. As substance classes, here there can be used diesters of phthalic acid, diesters of adipic acid and diesters of sebacic acid with longer-chain monoalcohols (2-ethylhexanol, isononanol, decyl alcohol, fatty alcohols, benzyl alcohol, glycol ether), triesters of citric acid, phosphoric acid esters of longer-chain aliphatic alcohols, dibenzoic acid esters of aliphatic alcohols, esters of fatty acids with aliphatic alcohols, diesters of polyethylene glycol ethers, esters of resin acids with longer-chain aliphatic alcohols, plasticizers based on epoxidized fatty acid esters or epoxidized oils, carbon plasticizers and chlorinated paraffins. The mechanical properties of the polymer can be adjusted thereby. In particular, the absorbency of the core material for certain feature substances can be increased.

Preferably, 0.1 to 5 weight percent of plasticizer are added relative to the mass of the core material, further preferably 0.2 to 2%, particularly preferably 0.3 to 0.6%.

According to a further preferred embodiment UV absorbers are added to the core material. In this manner, the light resistance of the feature substance can be improved, for example. The added UV absorbers preferably absorb in a wavelength range of 200 nm to 350 nm. Suitable UV absorbers are commercially available for example from the company BASF under the trade name Tinuvin and Chimassorb, for example Chimassorb 81.

According to a further preferred embodiment dyes are added to the core material. In this manner, the intrinsic coloration of the capsules can be adjusted for example (e.g. red or blue). Likewise, dyes can be employed to modulate the excitation or emission spectra of the feature substances.

The polymer particles condensed into the resin do not necessarily have to be spherical. In view of the polymer structure treated with the luminescent organic dyes, also platelet-shaped or undefined particle shapes can be employed.

According to a preferred embodiment the dyes are extruded in a polymer composition and subsequently ground to the desired grain size, preferably in a range of 0.05 µm to 100 µm.

According to the present invention, thermoplastic cores in which feature substances (e.g. fluorescent substances, metalorganic or organic IR or UV absorbers, photochromic substances), in particular luminescent substances, are present in dissolved form, are introduced in a duromer matrix. In this manner, the following advantages are achieved, among others:

- stabilization of the luminescent substances against aqueous acids and bases through the thermoplastic (e.g. PMMA);
- for this reason, no closed outer shell is required for acid/base stabilization;
- grindability and accordingly facilitated and cheaper scalability of the production process up to industrial scale;
- a higher luminance efficiency is achieved by physically dissolving the fluorescent substances in the thermoplastic; in this manner there result a reduced material usage and lower costs;
- the modification of the surface by the polar duromer matrix leads to an improved incorporation in printing inks.

The security pigments are preferably employed for the production of value documents. This takes place preferably in the form of a printing ink, in particular for offset printing, screen printing or steel intaglio printing. Instead of introducing the pigments directly into the printing lacquer and/or the printing ink, it is also possible to produce an ink concentrate from the pigments first. Said concentrate has a pigment content of 50%, for example, and can be introduced into the printing lacquer or printing ink later. This has application-technical advantages, such as faster introduction or avoiding dusting during introduction.

Alternatively, the security pigments can also be introduced into a polymer composition, preferably to prepare a master batch, or to produce a value document substrate, a security foil, a mottling fiber or a security thread. This can be effected by extrusion, for example.

The invention will hereinafter be described in more detail with reference to embodiments.

Example 1: Green Fluorescent Pigment 50 g PMMA spheres with an average molecular weight of 100,000 g/mol are dissolved with 5 g N-(2-(4-oxo-4H-benzo[d][1,3]oxazine-2-yl)phenyl)naphthalene-2-sulfonamide ($C_{24}H_{16}N_2O_4S$) in 1 liter dichloromethane. The mixture is placed in a reactor with 5 liters of an aqueous solution of 1% sodium dodecyl sulfate and dispersed with a homogenizer for 5 min. Subsequently, the dichloromethane is evaporated at 500 mbar while stirring. After removal of the dichloromethane, the remaining aqueous phase contains about 55 g spheres of PMMA with an average particle size of about 2 µm, which contain dissolved dye 1 (hereinafter referred to as "PMMA 1"). Using an ultracentrifuge, the particles are washed three times with 1 liter of water in each case and subsequently dried at 60° C.

In a laboratory kneader the components
79.63 g of the isocyanurate trimer of isophorone diisocyanate
22.46 g benzamide
2.00 g urea
14.12 g melamine
10 g PMMA 1
are kneaded at 180° C. until solidification. The granulate obtained is ground to a grain size (d99) of 11 µm. This results in a mass proportion of the dye in the pigment of 0.72%.

The pigment obtained is incorporated at a concentration of 15% into an offset lacquer (Sicpa Holding SA) with a three-roll mill and proofed with a weight of the proof of 2 g/m² in offset printing. A proof is obtained which fluoresces green in 365 nm excitation light.

The proof shows a high stability against organic solvents and aqueous acids and bases, whereas proofs of the pure dye are not resistant.

Example 2: Red Fluorescent Pigment 50 g PMMA spheres with an average molecular weight of 100,000 g/mol are dissolved with 3 g $Eu(TTA)_3(TPPO)_2$ (TTA=thenoyltrifluoroacetone; TPPO=triphenylphosphine oxide) in 1 liter dichloromethane. The mixture is placed in a reactor with 5 liters of an aqueous solution of 1% sodium dodecyl sulfate and dispersed with a homogenizer for 5 minutes. Subsequently, the dichloromethane is evaporated at 500 mbar while stirring. After removal of the dichloromethane, the remaining aqueous phase contains about 53 g spheres of PMMA with an average particle size of about 2 µm, which contain dissolved dye 2 (hereinafter referred to as "PMMA 2"). Using an ultracentrifuge, the particles are washed three times with 1 liter of water in each case and subsequently dried at 60° C.

In a laboratory kneader the components
79.63 g of the isocyanurate trimer of isophorone diisocyanate
31.72 g p-toluenesulfonamide
2.00 g urea
14.12 g melamine
10 g PMMA 2
are kneaded at 180° C. until solidification. The granulate obtained is ground to a grain size (d99) of 11 µm. The pigment obtained is incorporated at a concentration of 15% into an offset lacquer (hubergroup Deutschland GmbH) with a three-roll mill and proofed with a weight of the proof of 2 g/m² in offset printing. A proof is obtained which fluoresces red in 365 nm excitation light.

The proof shows a high stability against organic solvents and aqueous acids and bases, whereas proofs of the pure dye are not resistant.

Example 3 (Comparative Example)

In a laboratory kneader the components
79.63 g of the isocyanurate trimer of isophorone diisocyanate
31.72 g p-toluenesulfonamide
2.00 g urea
14.12 g melamine
9 g N-(2-(4-oxo-4H-benzo[d][1,3]oxazine-2-yl)phenyl)naphthalene-2-sulfonamide ($C_{24}H_{16}N_2O_4S$)
are kneaded at 180° C. until solidification. The granulate obtained is ground to a grain size of d99: 11 µm. This results in a mass proportion of dye in the pigment of 6.6%.

The pigment obtained is incorporated at a concentration of 15% into an offset lacquer (Sicpa Holding SA) with a three-roll mill and proofed with a weight of the proof of 2 g/m² in offset printing.

Example 4: Yellow Fluorescent Pigment 50 g PMMA spheres with an average molecular weight of 120,000 g/mol are dissolved with 3 g N-(2-(4-oxo-4H-benzo[d][1,3]oxazine-2-yl)phenyl)naphthalene-2-sulfonamide ($C_{24}H_{16}N_2O_4S$) (=dye 1) and 2 g Eu(TTA)$_3$(TPPO)$_2$ (TTA=thenoyltrifluoroacetone; TPPO=triphenylphosphine oxide) (=dye 2) in 1 liter dichloromethane. The mixture is placed in a reactor with 5 liters of an aqueous solution of 1% sodium dodecyl sulfate and dispersed with a homogenizer for 5 min. Subsequently, the dichloromethane is evaporated at 500 mbar while stirring. After removal of the dichloromethane, the remaining aqueous phase contains about 55 g spheres of PMMA with an average particle size of about 2 μm, which contain dissolved dye 1 and dye 2 (hereinafter referred to as "PMMA 1-2"). Using an ultracentrifuge, the particles are washed three times with 1 liter of water in each case and subsequently dried at 60° C.

In a laboratory kneader the components
71.8 g isophorone diisocyanate
34.8 g p-toluenesulfonamide
20.09 g melamine
10 g PMMA 1-2
are kneaded at 180° C. until solidification. The granulate obtained is ground to a grain size (d99) of 11 μm. The pigment obtained is incorporated at a concentration of 15% into a water-based screen printing ink (Proll KG) with a three-roll mill and proofed with a weight of the proof of 6 g/m² in screen printing. A proof is obtained which fluoresces yellow through excitation with 365 nm.

The proof shows a high stability against organic solvents and aqueous acids and bases, whereas proofs of the pure dye are not resistant.

Example 5: Yellow Fluorescent Pigment 25 g PMMA spheres with an average molecular weight of 80,000 g/mol are dissolved with 2 g N-(2-(4-oxo-4H-benzo[d][1,3]oxazine-2-yl)phenyl)naphthalene-2-sulfonamide ($C_{24}H_{16}N_2O_4S$) (=dye 1) in 0.5 liter dichloromethane. The mixture is placed in a reactor with 2.5 liters of an aqueous solution of 1% sodium dodecyl sulfate and dispersed with a homogenizer for 5 min. Subsequently, the dichloromethane is evaporated at 500 mbar while stirring.

In a second reactor 25 g PMMA spheres with an average molecular weight of 100,000 g/mol are dissolved with 2 g Eu(TTA)$_3$(TPPO)$_2$ (TTA=thenoyltrifluoroacetone; TPPO=triphenylphosphine oxide) (=dye 2) in 0.5 liter dichloromethane. The mixture is placed in a reactor with 2.5 liters of an aqueous solution of 1% sodium dodecyl sulfate and dispersed with a homogenizer for 5 min. Subsequently, the dichloromethane is evaporated at 500 mbar while stirring.

After removal of the dichloromethane, the remaining aqueous phases each contain about 25 g spheres of PMMA with an average particle size of about 2 μm, which contain dissolved dye 1 or the dissolved dye 2 (hereinafter referred to as "PMMA 1b" and "PMMA 2b"). Using an ultracentrifuge, the particles are washed three times with 1 liter of water in each case and subsequently dried at 60° C.

In a laboratory kneader the components
71.8 g isophorone diisocyanate
22.46 g benzamide
20.09 g melamine
5 g PMMA 1b
5 g PMMA 2b
are kneaded at 180° C. until solidification. The granulate obtained is ground to a grain size (d99) of 11 μm. The pigment obtained is incorporated at a concentration of 15% into a water-based screen printing ink (Proll KG) with a three-roll mill and proofed with a weight of the proof of 6 g/m² in screen printing. A proof is obtained which fluoresces yellow through excitation with 365 nm.

The proof shows a high stability against organic solvents and aqueous acids and bases, whereas proofs of the pure dye are not resistant.

Example 6: Intensity and Stability Measurements of the Examples 1 and 3 (Comparative Example)

The intensity measurements are performed on the proofs produced under a defined measurement geometry. As measuring device, the fluorescence spectrometer Perkin-Elmer LS50B was employed for this purpose.

| Sample | Mass proportion of dye in the pigment | Luminescence intensity at emission maximum 527 nm [counts] |
| --- | --- | --- |
| Proof from example 1 | 0.72% | 398 |
| Proof from example 3 | 6% | 392 |

In the comparative example 3, more than the 8-fold quantity of dye has been employed. The obtained intensity of the luminescence is not higher than in the example 1, however.

The stability against bases is tested by a 10-minute submersion of the proof from example 1 and of the proof from the comparative example 3 in 1-molar sodium hydroxide solution. The subsequent intensity measurement is again performed under a defined measurement geometry. The measuring device Perkin-Elmer LS50B was employed for this purpose as well.

| Sample | Remaining intensity after base stability test |
| --- | --- |
| Example 1 | 78% |
| Comparative example 3 | 12% |

Example 7: IR-Absorbing Pigment 25 g PMMA spheres with an average molecular weight of 80,000 g/mol are dissolved with 1 g of the IR absorber CKK-55 (Fujifilm Imaging Colorants) and 0.25 g dibutyl phthalate in 0.5 liter dichloromethane. The mixture is placed in a reactor with 2.5 liters of an aqueous solution of 1% sodium dodecyl sulfate and dispersed with a homogenizer for 5 min. Subsequently, the dichloromethane is evaporated at 500 mbar while stirring.

After removal of the dichloromethane, the remaining aqueous phase contains about 26 g spheres of PMMA with an average particle size of about 2 μm, which contain dissolved IR absorber CKK-55 (hereinafter referred to as "PMMA CCK-55"). Using an ultracentrifuge, the particles are washed three times with 1 liter of water in each case and then dried at 60° C.

In a laboratory kneader the components
71.8 g isophorone diisocyanate
22.7 g benzamide
20.09 g melamine
10 g PMMA CKK-55
are kneaded at 180° C. until solidification. The granulate obtained is ground to a grain size (d99) of 11 μm. The pigment obtained is incorporated at a concentration of 15% into an offset lacquer (Sicpa Holding SA) with a three-roll mill and proofed with a weight of the proof of 2 g/m² in offset printing. The proof shows an absorption band in the NIR range at 850 nm.

The proof shows a high stability against organic solvents and aqueous acids and bases, whereas proofs of the pure absorber are not resistant.

Example 8: Photochromic Pigment 50 g PMMA spheres with an average molecular weight of 110,000 g/mol are dissolved with 1.65 g cis-1,2-dicyano-1,2-bis(2,4,5-trimethyl-3-thienyl)ethene ($C_{18}H_{18}N_2S_2$) in 1 liter dichloromethane. The mixture is placed in a reactor with 5 liters of an aqueous solution of 1.5% sodium dodecyl sulfate and dispersed with a homogenizer for 5 min. Subsequently, the dichloromethane is evaporated at 750 mbar while stirring. After removal of the dichloromethane, the remaining aqueous phase contains about 51 g spheres of PMMA with an average particle size of about 2 μm, which contain the dissolved photochromic dye (hereinafter referred to as "PMMA DBP"). Using an ultracentrifuge, the particles are washed three times with 1 liter of water in each case and then dried at 60° C.

In a laboratory kneader the components
73.1 g isophorone diisocyanate
20.47 g benzamide
21.29 g melamine
8.5 g PMMA DBP
are kneaded at 140° C. until solidification. The granulate obtained is ground to a grain size (d99) of 11 μm. The pigment obtained is incorporated at a concentration of 15% into an offset lacquer (Sicpa Holding SA) with a three-roll mill and proofed with a weight of the proof of 2 g/m² in offset printing. A colorless proof is obtained which shows a reddish color impression upon irradiation with 330 nm. This color impression vanishes either by slight heating or by irradiation with visible light (e.g. of the wavelength 520 nm).

The proof shows a high stability against organic solvents and aqueous acids and bases, whereas proofs of the pure dye are not resistant.

Example 9: Pigment with UV Absorber and Intrinsic Color 50 g PMMA spheres with an average molecular weight of 100,000 g/mol are dissolved with 1.5 g of the blue dye "Oil Blue 35" (1,4-bis-(butylamino)-anthraquinone, $C_{22}H_{26}N_2O_2$) and 1 g of the UV absorber 2-hydroxy-4-(octyloxy)benzophenone ($CH_3(CH_2)_7OC_6H_3(OH)COC_6H_5$) in 1 liter dichloromethane. The mixture is placed in a reactor with 5 liters of an aqueous solution of 1% sodium dodecyl sulfate and dispersed with a homogenizer for 5 min. Subsequently, the dichloromethane is evaporated at 750 mbar while stirring. After removal of the dichloromethane, the remaining aqueous phase contains about 51 g spheres of PMMA with an average particle size of about 2 which contain the dissolved blue dye and UV absorber (hereinafter referred to as "PMMA SBUV"). Using an ultracentrifuge, the particles are washed three times with 1 liter of water in each case and subsequently dried at 60° C.

In a laboratory kneader the components
73.1 g isophorone diisocyanate
20.47 g benzamide
21.29 g melamine
8.5 g PMMA SBUV
are kneaded at 140° C. until solidification. The granulate obtained is ground to a grain size (d99) of 11 μm. The pigment obtained is incorporated at a concentration of 15% into an offset lacquer (Sicpa Holding SA) with a three-roll mill and proofed with a weight of the proof of 2 g/m² in offset printing. A proof is obtained which is colored blue and in addition has an absorption band in the range of 280-350 nm.

The proof shows a high stability against organic solvents and aqueous acids and bases, whereas proofs of the pure absorber are not resistant.

The invention claimed is:

1. A security pigment for the production of value documents, the security pigment comprising:
   a duromer matrix, wherein the duromer matrix includes an addition polymer; and
   a plurality of core particles of a thermoplastic polymer with a feature substance dissolved in the core particles, said plurality of core particles being embedded in the duromer matrix,
   wherein
      the thermoplastic core particles are present in the duromer matrix at a concentration between 0.1 and 25 weight percent,
      the feature substance is an organic or a metalorganic substance, and
      the security pigment has a grain size (d99) of smaller than 6 μm; and
   wherein the chain lengths of the thermoplastic polymer are in the range of 1,000-1,000,000 g/mol.

2. The security pigment according to claim 1, wherein the feature substance is a fluorescent or phosphorescent or photochromic or thermochromic feature substance or a UV or IR or VIS absorption dye.

3. The security pigment according to claim 1, wherein the fluorescent or phosphorescent feature substance is excitable in the UV spectral range and emits in the visible spectral range.

4. The security pigment according to claim 1, wherein in the core particles two different luminescent dyes are present in dissolved form, which form an energy transfer system in which the first dye after excitation transfers its excitation energy partially or completely to the second dye.

5. The security pigment according to claim 1, wherein the thermoplastic polymer is selected from one or more of: polystyrene (PS), polyacrylates, polyethylene (PE), polypropylene (PP), polycarbonates (PC), polyamides (PA), polyurethanes (PU), polyureas (PH), polyethylene terephthalate (PET), or a polyester, a polyacrylates polymethyl methacrylate (PMMA), polyvinyl acetate (PVAC), polyvinyl chloride (PVC), or polyacrylonitrile (PAN).

6. The security pigment according to claim 1, wherein the chain lengths of the thermoplastic polymer are in the range of 50,000-250,000 g/mol.

7. The security pigment according to claim 1, wherein the addition polymer is a mixture of different mono-, di- or triamines and a trimeric isocyanate.

8. The security pigment according to claim 1, which are stable against toluene, ethyl acetate, hydrochloric acid (5%), sodium hydroxide solution (2%) and sodium hypochlorite solution (5% active chlorine) in accordance with the test method A5, wherein the feature intensity remaining after the test is higher than 80% of the initial intensity.

9. The security pigment according to claim 1, which are stable against acetone in accordance with the test method A5, wherein the feature intensity remaining after the test is higher than 80% of the initial intensity.

10. The security pigment according to claim 1, wherein the fluorescent or phosphorescent feature substance is excitable in the UV spectral range or in the visible spectral range and emits in the IR spectral range.

11. The security pigment according to claim 1, wherein the thermoplastic polymer includes polystyrene (PS), polyacrylate, polyethylene (PE), polypropylene (PP), polycarbonate (PC), polyamide (PA), polyurethane (PU), polyurea (PH), polyethylene terephthalate (PET), or a polyester.

12. The security pigment according to claim 1, wherein the thermoplastic polymer includes one or more of polyacrylates polymethyl methacrylate (PMMA), polyvinyl acetate (PVAC), polyvinyl chloride (PVC), or polyacrylonitrile (PAN).

13. Pigment particles for security applications, the pigment particles comprising:
   a duromer matrix, and
   a plurality of core particles of a thermoplastic polymer with a feature substance dissolved in the core particles, the plurality of core particles being embedded in the duromer matrix,
   wherein the feature substance is an organic or a metalorganic substance, and
   wherein the fluorescent or phosphorescent feature substance is excitable in the UV spectral range or in the visible spectral range and emits in the IR spectral range.

14. A method for producing the security pigment according to claim 1, the method comprising the steps of:
   a) dissolving an organic or metalorganic feature substance in a thermoplastic polymer to supply in this manner thermoplastic particles with feature substance dissolved therein; and
   b) incorporating the thermoplastic particles with feature substance dissolved therein obtained in step a) in a duromer matrix,
   c) grinding the product obtained in step b) to core particles.

15. The method according claim 14, wherein step a) comprises the following partial steps of:
   a1) dissolving the thermoplastic polymer and the organic or metalorganic feature substance in an organic solvent,
   a2) dispersing the solution of step a1) in an aqueous medium employing a surfactant;
   a3) removing the organic solvent;
   a4) isolating the core particles; and
   wherein in step b) the embedding of the core particles is effected by a kneading or extrusion process of the core particles together with the monomers of the addition polymer.

16. An ink concentrate, comprising the security pigment according to claim 1, wherein the security pigment is formed into pigment particles, and the ink concentrate has a concentration of the pigment particles of more than 40 weight percent.

17. A printing ink for offset printing, screen printing, or steel intaglio printing, comprising the security pigment according to claim 1, wherein the security pigment is formed into pigment particles, and the printing ink has a concentration of the pigment particles of 1 weight percent to 40 weight percent.

18. A value document comprising pigment particles the pigment particles comprising
   a duromer matrix, and
   a plurality of core particles of a thermoplastic polymer with a feature substance dissolved in the core particles, the plurality of core particles being embedded in the duromer matrix, wherein the feature substance is an organic or a metalorganic substance.

19. A value document comprising the security pigment according to claim 1.

\* \* \* \* \*